United States Patent [19]
Iizuka

[11] 3,867,993
[45] Feb. 25, 1975

[54] COLLAPSIBLE AND MOTORIZED CART

[75] Inventor: Kozaburo Iizuka, Yokohama, Japan

[73] Assignee: J. Osawa & Co., Ltd., Tokyo, Japan

[22] Filed: May 24, 1973

[21] Appl. No.: 363,572

[30] Foreign Application Priority Data
June 5, 1972 Japan............................... 47/65427

[52] U.S. Cl.............. 180/19 R, 280/DIG. 5, 280/42
[51] Int. Cl......................... A63b 55/08, B62d 51/04
[58] Field of Search........ 180/19 R; 280/DIG. 5, 40, 280/42

[56] References Cited
UNITED STATES PATENTS

| | | | |
|---|---|---|---|
| 3,167,146 | 1/1965 | Ruldolf.......................... | 280/DIG. 5 |
| 3,232,367 | 2/1966 | York................... | 180/19 R |
| 3,561,555 | 2/1971 | Carmichael....................... | 180/19 R |
| 3,704,758 | 5/1970 | Cropp............................ | 280/DIG. 5 |

Primary Examiner—David Schonberg
Assistant Examiner—John A. Pekar

[57] ABSTRACT

A novel collapsible and motorized cart comprising a foldable handle, a link mechanisms operatively connected said handle to open or close cart legs, link mechanisms connected to each of said cart leg to move the legs in parallel position, and independent motors to drive each cart wheel.

5 Claims, 7 Drawing Figures

Fig. 3
Fig. 4
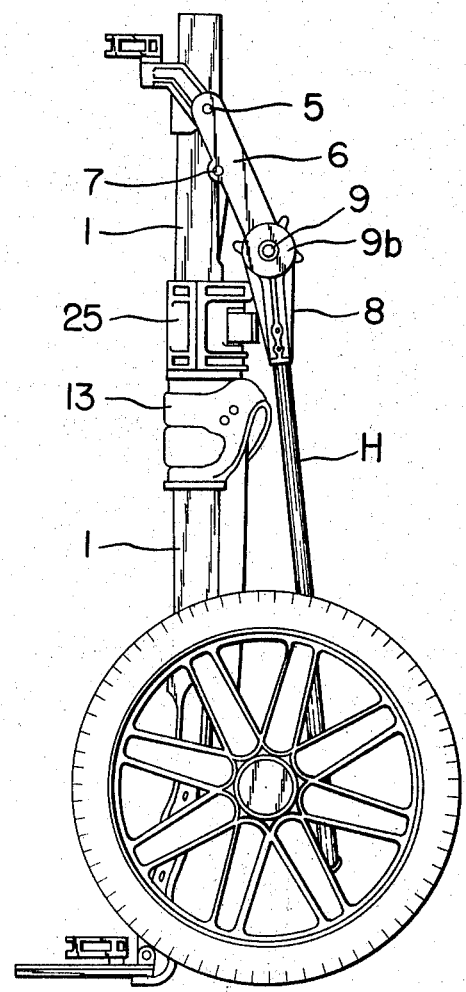
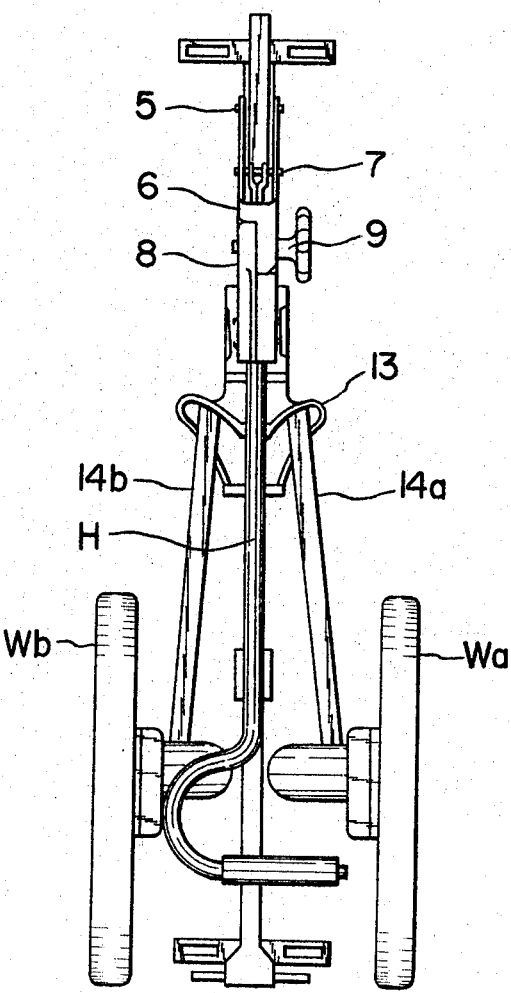

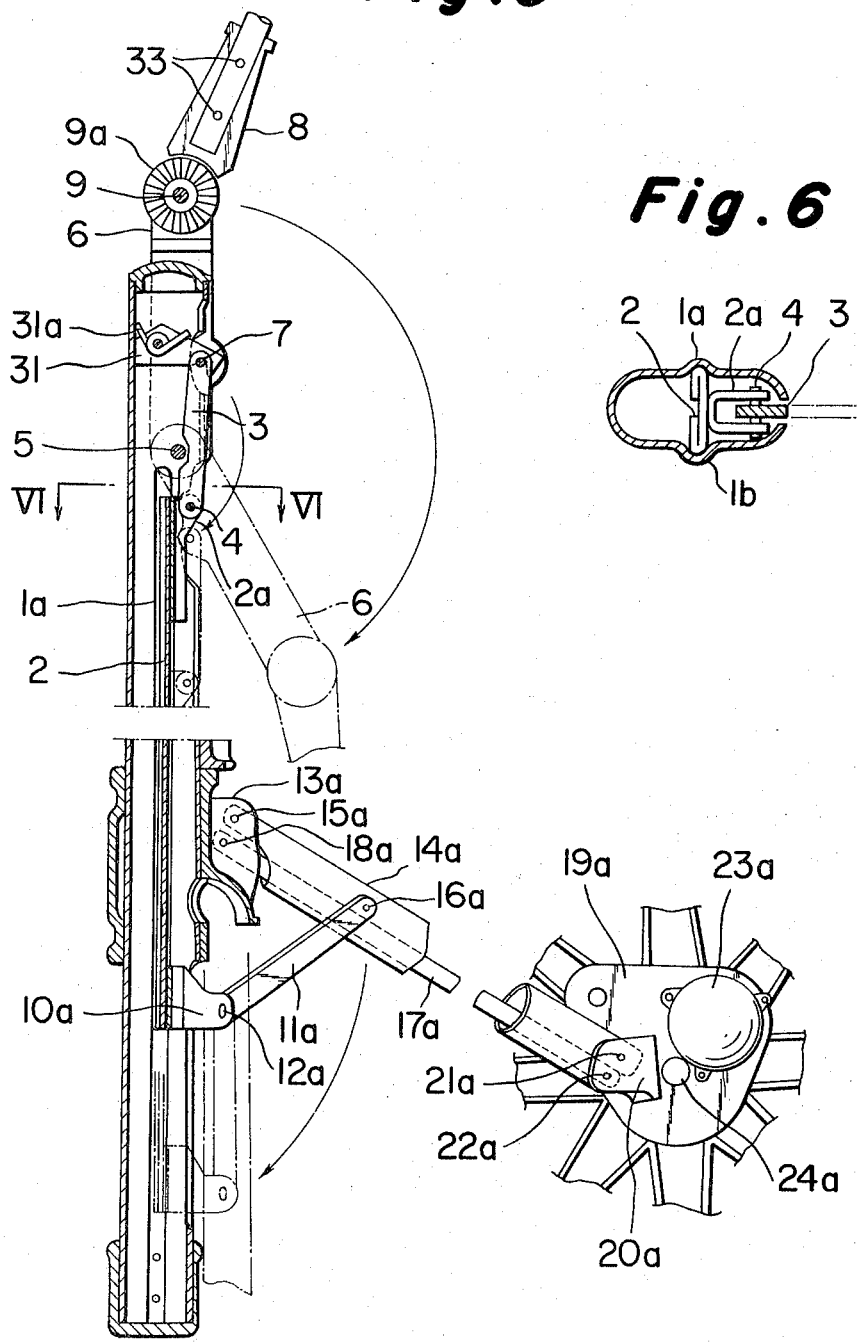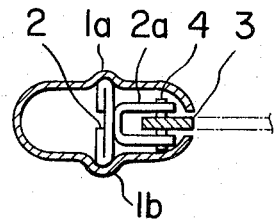

COLLAPSIBLE AND MOTORIZED CART

BACKGROUND OF THE INVENTION

The present invention relates generally to a cart, more particularly to a novel collapsible and motorized cart which can be transported by a truck also in the trunk of a passenger car. The cart of the present invention is motorized by installing independent motors to cart wheels and compact batteries to drive the motors in order to provide more conveniences for uses.

As the result of recent development of automobile industry, more number of automobiles are used not only for delivery of cargo but also for pastime purpose, and sporting goods are now often transported by a cart from automobile to playing ground. If a compact cart could be carried in a passenger car trunk, it makes easy to transport sporting goods and various types of foldable cart such as collapsible bicycle and golf cart have been hithertofore proposed. But most of these are manually operated and are not suitable for a long distance transportation of such goods. Object of the Invention:

The present invention is to provide an improved collapsible and motorized cart including compact DC-motors on cart wheels which is controlled of its starting and stopping by operating a switch installed on the handle of said cart, and also can be easily either pulled and pushed under a free running position.

The other objects and advantages of the present invention will be fully understood by the following description in connection with the accompanying drawings showing one of the preferred embodiments embodying as two-wheeled motorized golf bag cart by way of an example, wherein;

FIGS. 3 and 4 are side and rear elevations showing the closed position of the cart;

FIG. 5 is a fragmentary sectional view showing the link mechanism of two legs and parallel-mechanism in relation with main column;

FIG. 6 is an enlarged cross section of FIG. 5 along a plane of VI—VI, and

DESCRIPTION OF THE EMBODIMENT

Figure 1:
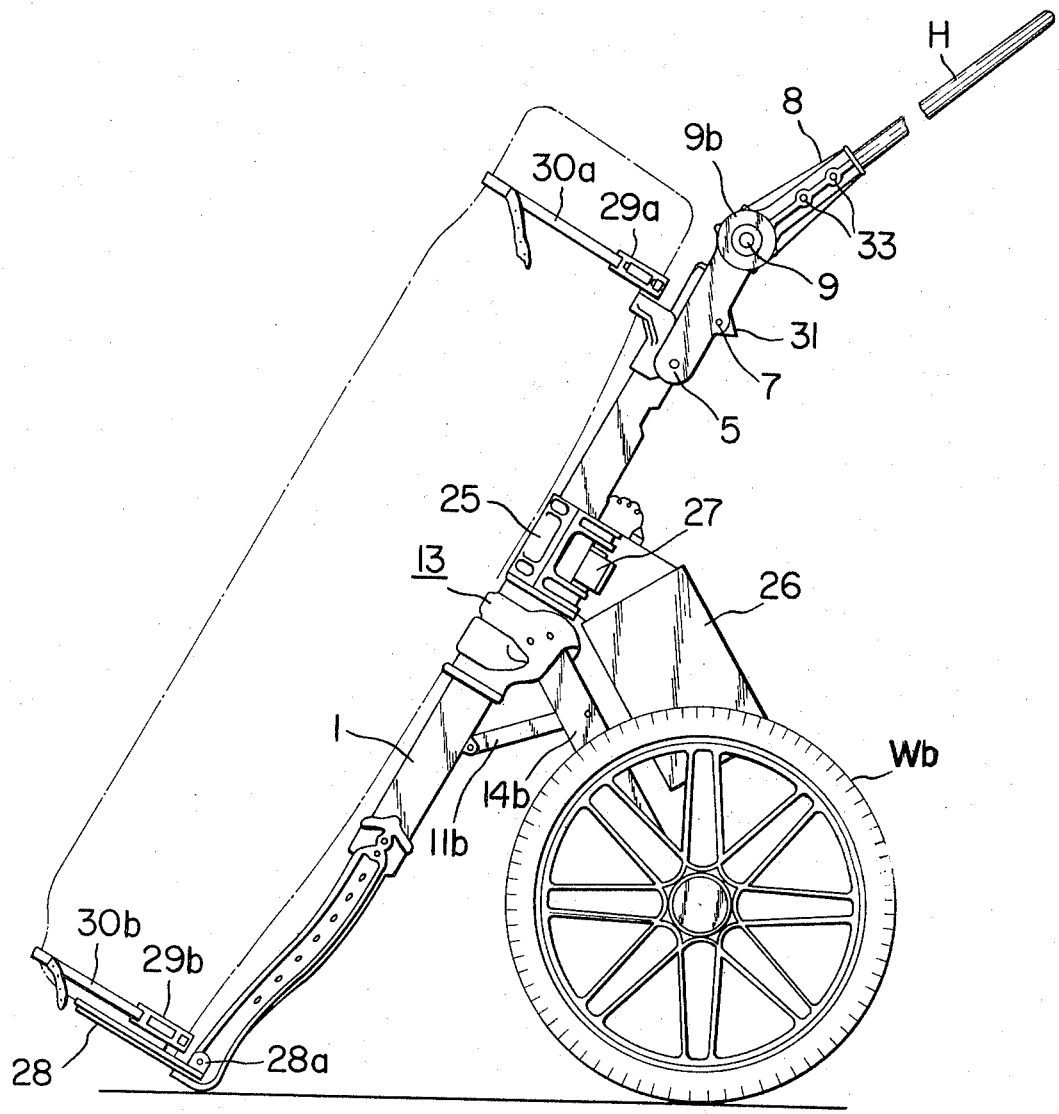
FIG. 1 shows a side-view of an embodiment constructed in accordance with the present invention.

The cart shown in the drawings comprises a main column 1 of oval cross section having guide grooves 1a and 1b on both sides in which link mechanism is built-in so that a link 2 can slidably move along said guide grooves 1a and 1b. A link 3 is connected by a pin 4 with a bracket 2a which is fixed to upper end of the link 2, and the other end of the link 3 is connected with a lever 6 by a pin 7, said lever 6 being connected by a pin 5 with the main column 1. To the other end of said lever 6 a circular plate 9a is attached having a plurality of radial V-shaped grooves, and a similar circular plate 9b is attached to the oppositie side of the lever together with a handle holding clamp 8. Both plates 9a and 9b may be fixed together by matching the opposite grooves with tightening of a set screw 9 so that the angle between the lever 6 and the handle holding clamp 8 can be adjusted for suitable height of handle. Said handle holding clamp 8 is consisting of two sections and a handle H may be inserted between the separated two sections and tightened by a bolt 33 so that the direction of the handle grip may be easily changed for convenience of either the right-handed person or the left-handed person. The lower end of the link 2 has two brackets 10a and 10b on which supporting arms 11a and 11b are attached respectively with pins 12a and 12b, and the other ends of the supporting arms are connected with legs 14a and 14b of oval cross section with pins 16a and 16b. Said legs 14a and 14b are connected to the brackets 13a and 13b by pins 15a and 15b, and said brackets are fixed to the main column 1 accordingly.

Therefore there are formed two triangles with the connected points 15a–12a–16a and 15b–12b–16b respectively. The leg 14a has a built-in link 17a which may move inside of the leg 14a and one end of the link 17a is connected with the bracket 13a with a pin 18a and the other end of said leg 14a and the link 17a are connected with a bracket 20a which is attached to a reduction gear box 19a of the wheel Wa by pins 21a and 22a so that these links 14a, 17a and bracket 13a, 20a form a four-joint linkage for parallel movement.

In the same manner, the leg 14b has a built-in link 17b which may move inside of the leg 14b and one end of the link 17b is connected with the bracket 13b by a pin 18b and the other end of said leg 14b and link 17b are connected with a bracket 20b which is attached to a reduction gear box 19b of the wheel Wb by pins 21b and 22b so that these links 14b, 17b and brackets 13b, 20b form a four-joint linkage for parallel movement.

DC motors 23a and 23b are attached to the reduction gear boxes 19a and 19b and motor axle (not shown in the drawings) is connected with the reduction gear boxes 19a and 19b and its driving forces will be transmitted to the wheels Wa and Wb from wheel axles 24a and 24b respectively. The wheel axles 24a and 24b have one-way clutches (not shown in the drawings) so that these wheels may be released from the reduction gear engegement.

The main column 1 is equipped with a battery mounting adapter 25 to mount battery 26 with a locking means 27. Changing the battery may be carried out by use of said locking means. At the bottom of the main column 1, a bag holder 28 is fixed by pins, while on the upper part of the main column 1 an upper bag holding buckle 29a with a band 30a is attached, and said bag holder 28 is equipped with a bag holding buckle 29b with a band 30b so as to hold the golf bag tightly with the bands 30a and 30b. A claw 31 is located at the upper part of the main column 1 to hook the pin 7, and a coiled spring 31a is keeping a pressure onto said claw 31 to hold the pin 7 for the purpose of preventing the pin off from the claw 31. The handle grip 32 has a switch 34, and said switch, battery 26 and motors 23a and 23b on two wheels are electrically connected with wirings through inside the handle H, upper part of the main column 1 and legs 14a and 14b, so that the motors may be controlled by the switch on the handle.

Because of the afore-mentioned construction, erection of the cart of the present invention from its collapsed condition (FIGS. 3 and 4) to its operating condition can be made as follows: at first the main column 1 is inclined forwardly to lift the wheels off the ground, and the handle H is raised up by rotating it about the pin 5. Then the link 2 is lifted upward through the link 3 pivotally connected with the midpoint of the lever 6 which is firmly connected with the handle H through the handle holding clamp 8, and the arms 11a and 11b pivotally supported by the brackets 10a and 10b at the lower end of the link 2 spread out the legs 14a and 14b connected by pins 15a and 15b with the brackets 13a and 13b which are fixed to the main column 1. When the legs 14a and 14b are spread outwardly, the four-joint linkage 13a–14a–20a–17a and 13b–14b–20b–17b with the fixed links 13a and 13b move parallel each other to spread out two wheels Wa and Wb in keeping the parallel relationship from its closed position.

Figure 2:
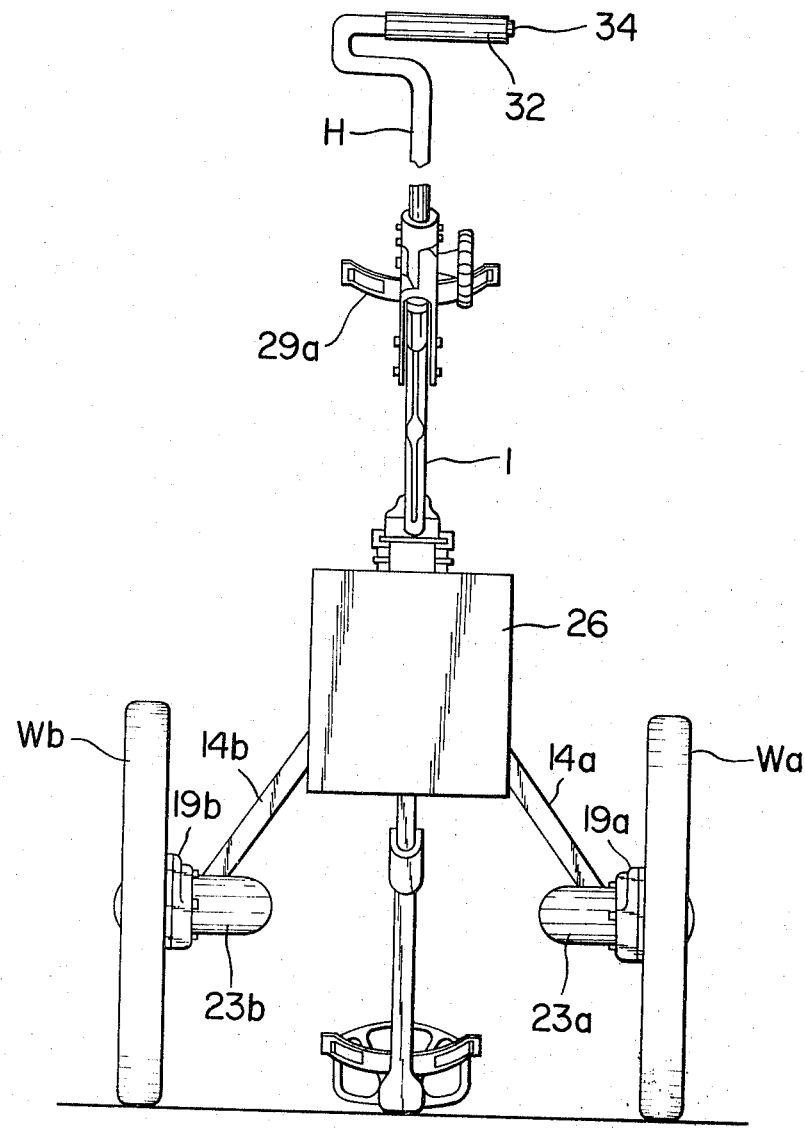
FIG. 2 is a rear elevation of the embodiment shown in FIG. 1.
Figure 7:
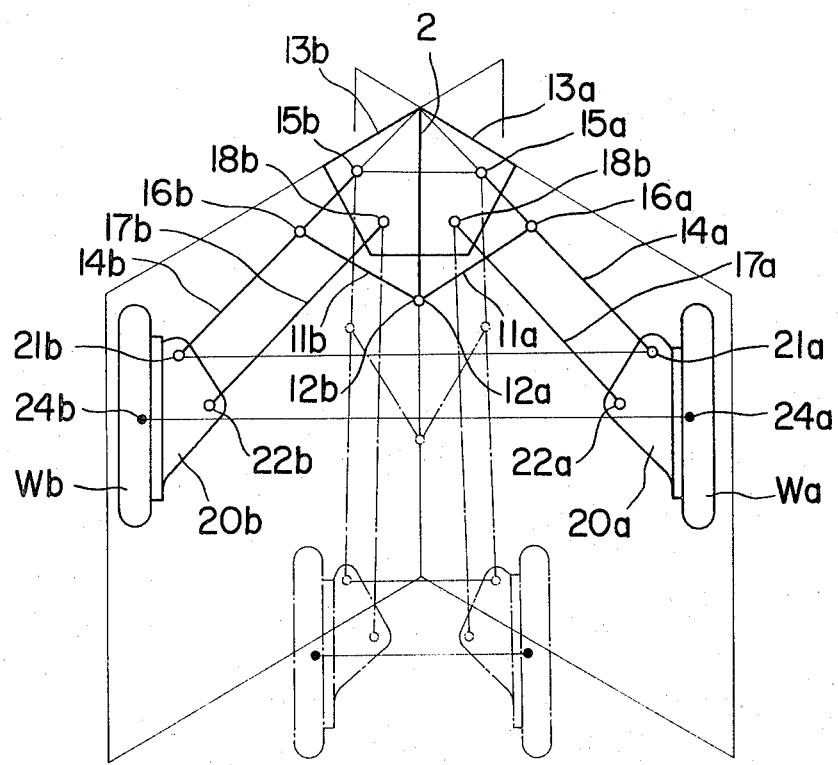
FIG. 7 is a diagram to explain the principle of the parallel movement of two wheels as two legs are closed and opened.

This system may be clearly understood from FIG. 7 which shows an operational diagram. The handle H should be lifted up as shown in FIGS. 1 and 2, the battery 16 is mounted on the adapter 25 and wires are electrically connected. A golf bag is placed on the bag holder 28 and rested against the bag holding buckles 29a and 29b and tightened with the bands 30a and 30b. To operate the cart, the user takes the hand grip 32 and pushes the handle so as to lift up the bottom of the main column off the ground, then pushes the switch into its ON position to move the cart by motors to turn wheels and moves the cart accordingly. When changing direction, the user just swings the handle H in the opposite direction, then the inside motor stops momentarily while outer wheel rotates to change direction and then two wheels start to move forward at the same time to move the cart. In stopping the cart, the user turns off the switch to stop motors and place the bottom of the main column 1 onto the ground so that the cart stands still with two wheels and bottom of the main column at three points of support.

After the usage, the user releases the locking means 27 and takes off the battery 26 from the adapter 25, and lifts up the wheels off the ground as did at the time of setting up of the cart and unhooks the claw 31 from the pin 7. When the handle is rotated downward about the pin 5, the link 2 may be easily slided into the main column 1, and the supporting points 12a and 12b of supporting arms 11a and 11b are pushed downward. Consequently, legs 14a and 14b start to turn with pins 15a and 15b, and links 17a and 17b in the legs 14a and 14b move in parallel relation to bring back the wheels to its closed position as shown in FIGS. 3 and 4. Thus collapsed cart may be put into a passenger car trunk with or without the golf bag on the cart.

As described in the above, the present invention provides a collapsible and motorized two-wheel cart consisting of a foldable handle, link mechanism to open or close two legs by operation of the handle, parallel link mechanisms to close or open two legs in a parallel relation, two wheels each equipped with independent drive motor so that the closing and spreading operation may be performed by the upward or downward movement of the handle H with a rotation about the pin, and the wheels may move in a parallel relation without a common axle for two wheels, so that by folding the handle to parallel position to the main column, the cart may be collapsed to a compact configuration for transportation. The main column 1 is made of a pipe section, and the link 2 is inserted in the main column 1 and further the links 17a and 17b of the four-joint linkage are inserted respectively in the other links 14a and 14b of said linkage made of pipe sections so that the mechanism has a solid and compact construction. Battery may be of 12 volts and 24 amperes, for example, and can be used for 3-hour travelling despite its small size so that it is sufficient to play full two rounds of golf games with a new battery. Furthermore, this cart can be operated manually because it has one-way clutches at the wheel axles even when the battery is fully discharged.

What is claimed is:

1. A collapsible motorized cart comprising:

a hollow main column;

a handle having one end pivotally coupled to an upper portion of said main column for movement of said handle to a collapsed position adjacent said main column;

an elongated sliding link positioned within said main column;

a driving link having one end pivotally coupled to an upper end of said sliding link, and another end pivotally coupled to said handle at a location spaced from said one end of said handle;

a pair of cart wheels;

a pair of DC motors, one of said motors coupled to one of said wheels and the other of said motors coupled to the other of said wheels, whereby each of said wheels is driven by an independent motor;

a pair of hollow legs, each having one end pivotally coupled to a corresponding one of said wheels, and another end pivotally coupled to a lower portion of said main column so that both legs extend outwardly from one side of said main column;

a pair of leg links, each positioned within a corresponding one of said hollow legs and having one end pivotally coupled to a corresponding one of said wheels and another end pivotally coupled to said lower portion of said main column;

a pair of supporting arms, each having one end pivotally coupled to a lower end of said sliding link, and another end pivotally coupled to a corresponding leg at a position between the ends of said leg, whereby movement of said handle from an extended position to said collapsed position moves said legs from a spread to a closed position.

2. The cart as claimed in claim 1, including bag holding means extending from the side of said main column opposite said one side.

3. The cart as claimed in claim 1, including battery mounting means on said main column between the ends of said main column for mounting a battery on said one side of said main column.

4. The cart as claimed in claim 1 including a spring loaded claw on said main column and detachably coupled to said handle to hold said handle in said extended position.

5. The cart as claimed in claim 1, wherein said handle includes adjustable positioning means adjacent said one end for adjusting the angular position of said handle with respect to said main column.

* * * * *